United States Patent
Mai et al.

(10) Patent No.: US 12,542,302 B2
(45) Date of Patent: Feb. 3, 2026

(54) SOLID ELECTROLYTE INTERPHASE IN LI SECONDARY BATTERIES

(71) Applicant: UMICORE, Brussels (BE)

(72) Inventors: Sebastian Mai, Ilmenau (DE); Svetlozar-Dimitrov Ivanov, Ilmenau (DE); Andreas Bund, Ilmenau (DE)

(73) Assignee: UMICORE, Brussels (BE)

( * ) Notice: Subject to any disclaimer, the term of this patent is extended or adjusted under 35 U.S.C. 154(b) by 755 days.

(21) Appl. No.: 17/785,476

(22) PCT Filed: Dec. 21, 2020

(86) PCT No.: PCT/EP2020/087386
§ 371 (c)(1),
(2) Date: Jun. 15, 2022

(87) PCT Pub. No.: WO2021/123409
PCT Pub. Date: Jun. 24, 2021

(65) Prior Publication Data
US 2023/0022865 A1 Jan. 26, 2023

Related U.S. Application Data

(60) Provisional application No. 62/951,036, filed on Dec. 20, 2019, provisional application No. 62/951,045, filed on Dec. 20, 2019.

(30) Foreign Application Priority Data

Dec. 20, 2019 (EP) ..................................... 19218679
Dec. 20, 2019 (EP) ..................................... 19218693
Sep. 4, 2020 (EP) ..................................... 20194612

(51) Int. Cl.
*H01M 10/0569* (2010.01)
*H01M 4/134* (2010.01)
(Continued)

(52) U.S. Cl.
CPC ....... *H01M 10/0569* (2013.01); *H01M 4/134* (2013.01); *H01M 10/0525* (2013.01);
(Continued)

(58) Field of Classification Search
CPC ......... H01M 10/0569; H01M 10/0525; H01M 2004/027; H01M 2300/0028; H01M 4/00–84
See application file for complete search history.

(56) References Cited

U.S. PATENT DOCUMENTS

2016/0226101 A1    8/2016  Teran et al.
2019/0140322 A1*   5/2019  Ren ....................... H01M 4/134

FOREIGN PATENT DOCUMENTS

JP    2012018801 A    1/2012
JP    2017228513 A   12/2017
(Continued)

OTHER PUBLICATIONS

KR20140125970. Oct. 30, 2014. English machine translation by EPO. (Year: 2014).*
(Continued)

*Primary Examiner* — James Lee
(74) *Attorney, Agent, or Firm* — Rimon P.C.; Allyn B. Elliott (57) ABSTRACT

The present invention relates to a solid electrolyte interphase composition having a $F:CF_3$ mol-ratio (x) of $0.00 < x \leq 12.00$; a negative electrode comprising a negative electrode material and a solid electrolyte interphase composition on a surface of said negative electrode material, wherein said solid electrolyte interphase composition has a molar ratio $F:CF_3$ (x) of $0.00 < x \leq 12.00$, as determined by XPS; as well as its application in a lithium secondary battery cell.

23 Claims, 6 Drawing Sheets

(51) Int. Cl.
*H01M 10/0525* (2010.01)
*H01M 4/02* (2006.01)

(52) U.S. Cl.
CPC ............... *H01M 2004/027* (2013.01); *H01M 2300/0028* (2013.01); *H01M 2300/0051* (2013.01)

(56) References Cited

FOREIGN PATENT DOCUMENTS

| | | |
|---|---|---|
| KR | 20140125970 A | 10/2014 |
| KR | 20200094692 A | 8/2020 |
| WO | 2012029551 A1 | 3/2012 |
| WO | 2016204278 A1 | 12/2016 |
| WO | 2018044952 A1 | 3/2018 |

OTHER PUBLICATIONS

WO2016204278A1. Dec. 22, 2016. English machine translation by EPO. (Year: 2016).*

Tong, BO, Ph.D., "Improving Stability of Lithium Metal Anodes through Electrolyte Engineering for Rechargeable Lithium Metal Batteries", Doctoral Dissertation, Physics and Chemistry of Materials, Huazhong University of Science & Technology, May 2019, 16 Pages.

ISA/EP; International Search Report and Written Opinion for International Patent Application No. PCT/EP2020/087386 dated Feb. 15, 2021, 11 pages.

Flamme, Benjamin, et al., "Sulfone Based-Electrolytes for Lithium-Ion Batteries: Cycling Performances and Passivation Layer Quality of Graphite and LiNi1/3Mn1/3Co1/3O2 Electrodes", Journal of the Electrochemical Society, vol. 167, No. 7, Jan. 10, 2020, 9 pages.

Rajan, Dhevathi, et al., "Analysis of the Separator Thickness and Porosity on the Performance of Lithium-Ion Batteries", International Journal of Electrochemistry, vol. 2018, Jul. 8, 2018, 8 pages.

Korean Patent Office: Office Action in Korean Patent Application No. 10-2022-7025139, mailed Nov. 18, 2024, 6 pages.

Korean Patent Office: Office Action in Korean Patent Application No. 10-2022-7025139, mailed Nov. 18, 2024, English Translation, 6 pages.

USPTO: Non-final Office Action for U.S. Appl. No. 17/785,459, mailed Jan. 29, 2025, 20 pages.

USPTO: Final Office Action for U.S. Appl. No. 17/785,459, mailed Jun. 18, 2025, 20 pages.

* cited by examiner

Figure 6 ial No. PCT/EP2020/087386, filed on Dec. 21, 2020, which claims the benefit of European Patent Application No. 20194612.6, filed on Sep. 4, 2020, and European Patent Application No. 19218679.9, filed on Dec. 20, 2019, and European Patent Application No. 19218693.0, filed on Dec. 20, 2019, and U.S. Provisional Patent Application No. 62/951,036, filed on Dec. 20, 2019, and U.S. Provisional Patent Application No. 62/951,045, filed on Dec. 20, 2019.

SOLID ELECTROLYTE INTERPHASE IN LI SECONDARY BATTERIES

CROSS-REFERENCE TO RELATED APPLICATIONS

This application is a U.S. National Stage application of International Patent Application No. PCT/EP2020/087386, filed on Dec. 21, 2020, which claims the benefit of European Patent Application No. 20194612.6, filed on Sep. 4, 2020, and European Patent Application No. 19218679.9, filed on Dec. 20, 2019, and European Patent Application No. 19218693.0, filed on Dec. 20, 2019, and U.S. Provisional Patent Application No. 62/951,036, filed on Dec. 20, 2019, and U.S. Provisional Patent Application No. 62/951,045, filed on Dec. 20, 2019.

TECHNICAL FIELD

The present invention relates to a solid electrolyte interphase (SEI) composition having a F:$CF_3$ molar ratio (x) of $0.00<x\leq12.00$ as well as its application in a Li metal-based battery, in particular a lithium secondary or lithium-ion battery cell.

BACKGROUND

The three primary functional components of a lithium-ion battery are the anode, the cathode, and the electrolyte. The anode of a conventional lithium-ion cell is made from carbon, the cathode of transition metal oxides such as cobalt, nickel, manganese and mixtures thereof, and the electrolyte is a non-aqueous solvent containing a lithium salt. Other lithium-ion batteries, e.g. based on lithium iron phosphates cathodes, are also present on the market.

The electrolyte should conduct lithium ions, acting as a carrier between the cathode and the anode when a battery passes an electric current through an external circuit. Electrolyte solvents according to the prior art partially decompose on initial charging and form a solid electrolyte interphase (SEI) layer, which is electrically insulating, yet provides sufficient ionic conductivity.

This interphase prevents further decomposition of the electrolyte in subsequent charge/discharge cycles, and is therefore also referred to as a passivation layer.

Such electrolyte solvents typically consist of a mixture of organic carbonates such as ethylene carbonate (EC), dimethyl carbonate (DMC) and propylene carbonate (PC) and the lithium salt normally consists of a hexafluorophosphate, $LiPF_6$. E.g., Camelia Matei Ghimbeu et al. 2013 J. Electrochem. Soc. 160, A1907 describes XPS analysis of a solid electrolyte interphase formed on a graphite electrode comprising PVdF binder. The electrolyte consisted of ethylene carbonate/dimethyl carbonate (1:1 v/v) or ethylene carbonate/propylene carbonate/dimethyl carbonate (1:1:3 v/v) mixtures containing either LiPFe or LiTFSI or their mixture. Liping Zheng et al. 2016 Electrochimica Acta 196, 169 describe lithium (fluorosulfonyl)(n-nonafluorobutane-sulfonyl)imide (LiFNFSI) as conducting salt to replace conventional used $LiPF_6$ in ethylene carbonate/ethyl methyl carbonate solvents.

As the market of lithium secondary batteries is rapidly expanding, there is an increasing demand for smaller and lighter batteries, which are suitable for portable electronic devices and which show tremendous energy densities. This led to intensive developments attempting to achieve safe and stable batteries with higher capacities and which are able to operate at high operating voltages.

The capacity of a battery for portable electronic devices has currently reached a plateau and the operating voltage of commercial batteries suitable for portable electronic devices currently varies from 4.2 V to maximum 4.4 V. For very high-end portable electronic devices such as leading-edge mobile phones, batteries applying operating voltages of at least 4.4 V (and preferably not more than 4.5 V) are requested. Moreover, some electrolyte compositions for secondary lithium ion battery cells have safety issues, i.e. being inflammable.

It is therefore an object of the present invention to provide a stable, safe, and high energy density battery exhibiting good cycle life (which can be for instance sufficient to high or excellent cycle life) enabled through a high coulombic efficiency (i.e. of at least 93%, preferably of at least 98%), preferably at a higher voltage range i.e. at a voltage higher than 4.4 V) versus conventional cut-off or operating voltages (limited to 4.4 V).

This object has been solved by providing an anode having on its surface a solid electrolyte interphase, said solid electrolyte interphase having a composition having a F:$CF_3$ molar ratio (x) of $0.00<x\leq12.00$, as well as its application in a lithium secondary battery cell.

It is indeed demonstrated that a columbic efficiency of a lithium anode is higher than 80% in a coin cell battery environment, when such battery comprises a SEI having the composition of according to the invention at the interface between the lithium anode and the electrolyte.

DETAILED DESCRIPTION OF THE INVENTION

The present invention relates to a solid electrolyte interphase composition having a F:$CF_3$ molar ratio (x) of $0.00<x\leq12.00$, preferably of $0.00<x\leq8.00$, more preferably of $0.10\leq x\leq8.00$ and even more preferably of $0.25\leq x\leq8.00$. In a more preferred embodiment, the F:$CF_3$ molar ratio (x) is $1.35\leq x\leq8.0$.

The present invention also relates to a negative electrode comprising the solid electrolyte interphase composition according to the present invention. More specifically, the present invention relates to a negative electrode comprising a negative electrode material and a solid electrolyte interphase composition on a surface of said negative electrode material, wherein said solid electrolyte interphase composition has a molar ratio F:CF$_3$ (x) of $0.00<x\leq12.00$, preferably of $0.00<x\leq8.00$, more preferably of $0.10\leq x\leq8.00$ and even more preferably of $0.25\leq x\leq8.00$. Said ratio is determined by XPS, as described below. Preferably, said molar ratio F:CF$_3$ (x) is $1.35\leq x\leq8.00$, and more preferably said ratio is higher than 2.0, higher than 3.0, or even higher than 4.0.

Figure 4:
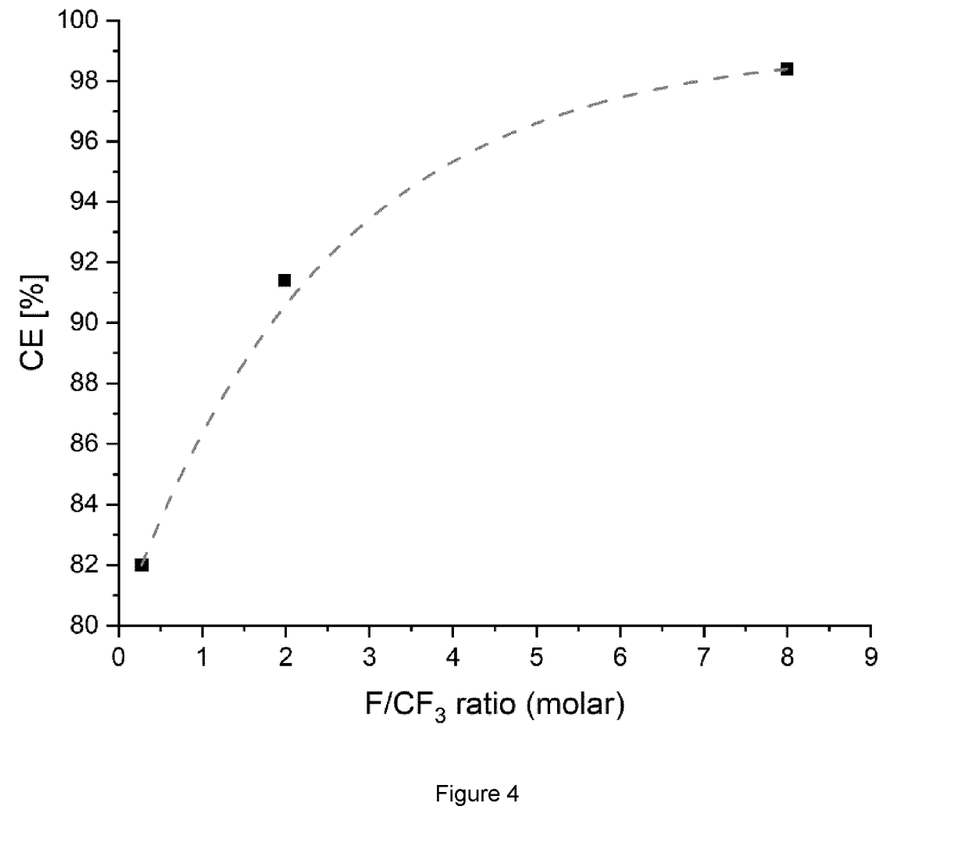
FIG. 4: Correlation between the coulombic efficiency and the molar F/$CF_3$ molar ratio in the solid electrolyte interphase.

The inventors have found that the coulombic efficiency increases significantly with higher F:CF$_3$ molar ratios, as is shown in FIG. 4.

A solid electrolyte interphase is a passivation layer which is formed on electrode surfaces from decomposition products of electrolytes. The SEI is placed at the interface between the electrode-electrolyte interface. In lithium secondary battery cells, the SEI allows for Li$^+$ transport but blocks electrons in order to prevent further electrolyte decomposition and to ensure continued electrochemical reactions. The SEI can have different effects for the electrode. On one hand, a dense and intact SEI may restrict the electron tunneling and thus may prohibit further reduction of the electrolyte, which is vital for the chemical and electrochemical stability of a battery. On the other hand, SEI formation and growth consume active lithium and electrolyte materials, may lead to capacity fading, increase of battery resistance, and poor power density.

Figure 6:
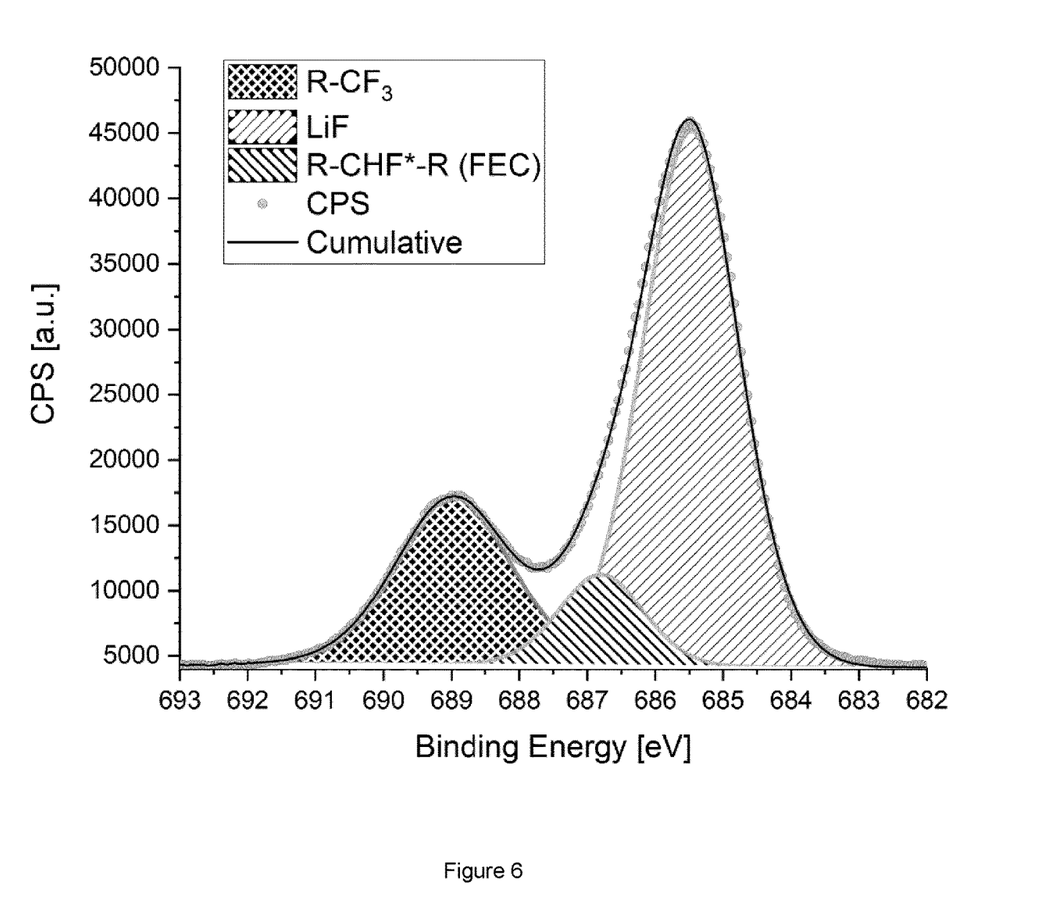
FIG. 6: XPS spectrum of a composition comprising lithium bis(trifluoromethansulfonyl) imide (LiTFSI), lithium fluoride (LiF) and fluoroethylene carbonate (FEC).

For the sake of clarity, a skilled person is able to determine the molar ratio F:CF$_3$ by standard methods of measurement. The molar ratio F:CF$_3$ can easily be derived by determination of the respective peak intensities corresponding to (i) F (corresponding to LiF), i.e. at a binding energy of 685.5 eV in the XPS spectrum, and to (ii) CF$_3$ (corresponding to LiTFSI), i.e. at a binding energy of 689 eV in the XPS spectrum. This is illustrated in FIG. 6 and is described in full detail in Section 3 of the Examples. The relative amount of F can be derived from LiF and the relative amount of CF$_3$ can be derived from the decomposition products from LiFSI within the SEI. The F:CF$_3$ molar ratio of the solid electrolyte interphase composition can be determined by X-ray photoelectron spectroscopy (XPS) according to the examples described herein-below.

For the sake of clarity, herein the term negative electrode is used interchangeable with the term anode.

The material of the anode is not particularly limited as long as it is a material capable of inserting and extracting lithium. For example, lithium metal, metallic copper, Sn—Cu, Sn—Co, Sn—Fe or Sn—An alloy such as —Ni, a metal oxide such as Li$_4$Ti$_5$O$_{12}$ or Li$_5$Fe$_2$O$_3$, a natural graphite, an artificial graphite, a boronized graphite, a mesocarbon microbead, a carbon material such as a pitch-based carbon fiber graphitized material, carbon-Si composite or a carbon nanotube.

The anode can be a foil or powder of the electrode material. In the case of powder, copper paste is formed by pressure molding with a known conductive aid and binder, or mixed with pyrrolidone and other organic solvents together with a known conductive aid and binder. It can be obtained by coating a current collector such as a foil and then drying.

In a preferred embodiment, the anode is a foil of lithium.

The solid electrolyte interface of the present invention is preferably directly attached to the anode.

The solid electrolyte interface of the present invention is preferably directly attached to the anode by passivation.

The solid electrolyte interphase composition according to the present invention may be obtained on the negative electrode by using, i.e. charging and discharging, an electrolyte composition suitable for lithium secondary batteries, comprising lithium bis(trifluoromethansulfonyl)imide (LiTFSI) in an amount (a) of $39.0$ vol. $\%\leq a\leq47.5$ vol. %, fluoroethylene carbonate (FEC) in an amount (y) of $0<y\leq15.0$ vol. %, equivalent to an amount of $0<y\leq14.0$ wt. %, relative to the total volume, respectively weight, of the electrolyte composition and the remaining volume of the electrolyte is comprised of a suitable solvent such as sulfolane (SL), wherein SL/LiTFSI is comprised in a molar ratio (z) of $2.0\leq z\leq3.5$, wherein vol. % is defined as the volume of a specific constituent divided by the total volume of LiTFSI (M: 287.08 g/mol, ρ: 1.33 g/cm$^3$), FEC (M: 106.05 g/mol, ρ: 1.45 g/cm$^3$), and SL (M: 120.17 g/mol, ρ: 1.26 g/cm$^3$).

LiTFSI (CAS: 90076-65-6), FEC (CAS: 114435-02-8) and SL (CAS: 126-33-0) are well known chemical compounds.

In an even more preferred embodiment, the electrolyte composition may comprise SL/LiTFSI in a molar ratio (z) of $2.5<z<3.5$. In an even more preferred embodiment, SL/LiTFSI may be comprised in a molar ratio (z) of $2.5<z\leq3.0$, preferably wherein the SL/LiTFSI in a molar ratio (z) of 3.0.

In a preferred embodiment, the electrolyte composition may comprise FEC in an amount (y) of $10.0\leq y\leq15.0$ vol. %, equivalent to an amount of $9.8\leq y\leq14.0$ wt. %. In a particularly preferred embodiment, the electrolyte composition may comprise fluoroethylene carbonate (FEC) in an amount of $10.0\leq y\leq15.0$ vol. %, equivalent to an amount of $9.8\leq y\leq14.0$ wt. %, and SL/LiTFSI in a molar ratio (z) of 3.0.

The way of preparing the electrolyte composition is not particularly limited, i.e. it can be for example prepared by mixing the ingredients.

The present invention also relates to a lithium secondary battery cell comprising a negative electrode according to the present invention, i.e. comprising the SEI of the present invention.

For the sake of clarity, the lithium secondary battery cell further comprises a cathode and an electrolyte, and optionally a separator.

The electrolyte preferably is an electrolyte composition suitable for lithium secondary batteries, comprising lithium bis(trifluoromethansulfonyl)imide (LiTFSI) in an amount (a) of $39.2$ vol. $\%\leq a\leq47.5$ vol. %, fluoroethylene carbonate (FEC) in an amount (y) of $0.0<y\leq15.0$ vol. %, equivalent to an amount of $0.0<y\leq14.0$ wt. %, and sulfolane (SL), wherein SL/LiTFSI is comprised in a molar ratio (z) of $2.0\leq z\leq3.5$.

In an even more preferred embodiment, the electrolyte composition may comprise SL/LiTFSI in a molar ratio (z) of $2.5<z<3.5$. In an even more preferred embodiment, SL/LiTFSI may be comprised in a molar ratio (z) of $2.5<z\leq3.0$, preferably wherein the SL/LiTFSI in a molar ratio (z) of 3.0.

In a preferred embodiment, the electrolyte composition may comprise FEC in an amount (y) of $10.0\leq y\leq15.0$ vol. %, equivalent to an amount of $9.8\leq y\leq14.0$ wt. %. In a particularly preferred embodiment, the electrolyte composition may comprise fluoroethylene carbonate (FEC) in an amount of $10.0\leq y\leq15.0$ vol. %, equivalent to an amount of $9.8\leq y\leq14.0$ wt. %, and SL/LiTFSI in a molar ratio (z) of 3.0.

The material of the cathode is not particularly limited, and examples thereof include a transition metal compound having a structure capable of diffusing lithium ions, or a specialized metal compound thereof and an oxide of lithium. Specifically, $LiCoO_2$, $LiNiO_2$, $LiMn_2O_4$, $LiFePO_4$, etc. can be mentioned.

The cathode can be formed by press-molding the cathode material listed above together with a known conductive auxiliary agent or binder, or the positive electrode active material together with a known conductive auxiliary agent or binder into an organic solvent such as pyrrolidone. It can be obtained by applying a mixture and pasting it to a current collector such as an aluminum foil, followed by drying.

In a preferred embodiment, the cathode comprises, preferably consists essentially of, a copper foil.

The material of the anode is not particularly limited as long as it is a material capable of inserting and extracting lithium as described hereinabove.

A separator is usually interposed between the cathode and the anode in order to prevent a short circuit between the cathode and the anode. The material and shape of the separator is not particularly limited, but it is preferable that the electrolyte composition can easily pass therethrough and is an insulator and a chemically stable material. Examples thereof include microporous films and sheets made of various polymer materials. Specific examples of the polymer material include polyolefin polymers, nitrocellulose, polyacrylonitrile, polyvinylidene fluoride, polyethylene, and polypropylene. From the viewpoints of electrochemical stability and chemical stability, polyolefin polymers are preferred.

In a preferred embodiment, the separator is a polypropylene separator with a thickness of 40 μm and porosity of 48% (e.g. Cellguard 2075-1500M). Such a separator is described in the following article: International Journal of Electrochemistry, Volume 2018, Article ID 1925708, 7 pages, https//doi.org/10.1155/2018/1925708.

The optimum working voltage of the lithium secondary battery of the present invention is not particulariy limited by the combination of the positive electrode and the negative electrode, but can be used at an average discharge voltage of 2.4 to 4.5 V. Preferably, the lithium secondary battery cell has a high operating voltage, i.e. an operating voltage superior or equal to 4.4 V and preferably inferior or equal to 4.5 V.

EXAMPLES

1. Description of Coin Cell Preparations

Tested cells were coin cell types CR2025. The cells were prepared by stacking positive casing, positive electrode (pre-soaked in electrolyte), Cellguard-separator, 50 μL electrolyte droplet, negative electrode, spacer, wave-type spring and negative casing on top of each other in that order. Crimping was done with a manual crimping press from MTI corp. at 80 kg/cm$^2$ pressure.

The electrolyte composition is obtained by adding fluoroethylene carbonate (FEC) in an amount (y) of 0<y≤15 vol. % with respect to the total volume of the electrolyte, to sulfolane (SL) and lithium bis(trifluoromethansulfonyl)imide (LiTFSI) in a SL/LiTFSI molar ratio (z) of 3 to 1.

2. Passivation Protocol

The passivation of the lithium samples was done by two steps. First, the cell described in the Section 1 above was constructed such that the cell was symmetric (Li metal is selected for both the anode and the cathode). Second, the cell was cycled 5 times with a current density of 0.60 mA/cm$^2$ for 2 hours per half cycle, resulting in a capacity of 1.20 mAh/cm$^2$. Afterwards the cells rested for 12 hours before being taken apart and the passivated Li electrodes comprising the SEI are extracted from the lithium cell.

3. Description of the Method of Measuring the Solid Electrolyte Interphase Using X-Ray Photoelectron Spectroscopy (XPS)

The solid electrolyte interphase according to the present invention on the lithium electrode is analyzed using XPS. After passivation, the lithium is cleaned with dimethoxyethane (DME) to wash away any residual (unreacted) electrolyte that would remain on the SEI.

Samples are stored under $10^{-2}$ mPa pressure and room temperature for approximately 8 hours for drying.

Afterwards the samples are placed in a transfer chamber under argon atmosphere and the transfer chamber is subsequently transferred to the antechamber of the XPS-SAGE HR 150 SPECS X-ray photoelectron spectrometer (base pressure <$10^{-8}$ mBar).

Measurements are taken with an Al-kα anode (1486.7 eV photon energy) utilizing three spectrum sweeps with a 0.05 eV resolution. The energy levels were calibrated with the 285 eV C—C signal.

Energy levels for R—$CF_3$ (689 eV), RH—F (687 eV) and LiF (685.5 eV) are easily distinguishable as can be seen from FIG. 6; and correspond to energy levels reported in literature, i.e. M. Agostini et al. 2015 Chemistry of Materiais, 27, 4604-4611; D. Aurbach et al. 2009 Journal of the Electrochemical Society, 156, A694-A702; J. Conder et al. 2017 Electrochimica Acta, 244, 61-68. Peak areas were determined by a weighed least-square fitting of model curves protocol (70% Gaussian, 30% Lorentzian) applied to the experimental data, using the software CASA XPS (ver. 23.16, Casa Software Ltd.—http//www.casaxps.com/). Quantification of atomic percentages was calculated on the basis of photoionization cross sections and asymmetry parameters by Yeh and Lindau using the built in function of Casa XPS. J. J. Yeh and I. Lindau, 1985 Atomic Data and Nuclear Data Tables, 32, 1-155. The molar ratio of F vs. $CF_3$ was calculated by following formula:

$$\text{molar ratio} \frac{F}{CF_3} = \frac{3.0 \cdot A_F}{A_{CF_3}}$$

The area (A) of the $CF_3$ signal fit is divided by a factor 3 because 3 F atoms are present for 1 mole of $CF_3$, whereas the factor is 1 for LiF (1 mole of F=1 F atom in LiF).

The equivalence between the F vs $CF_3$ signal-based ratio (A-factor) and the F vs $CF_3$ molar ratio is provided in the table hereunder:

| vol. % FEC | 1 | 5 | 15 |
|---|---|---|---|
| $A_F$ (LiF) | 8.4 | 33.3 | 65.6 |
| $A_{CF3}$ ($CF_3$) | 91.6 | 50.4 | 24.6 |
| CE (%) | 82 | 91.4 | 98.4 |
| (3 LiF)/$CF_3$ | 0.28 | 1.98 | 7.99 |

Description of Methods for Measuring the Coulombic Efficiency

The coin cell including a passivated lithium electrode is charged and discharged several times under the following conditions to determine their charge-discharge cycle performances: the coulombic efficiency is measured with a Biologic VMP-3 potentiostat using a cell configuration consisting of a copper foil as cathode and a lithium foil as anode. Initially a certain amount of lithium metal (about 1 mg/50 μL of electrolyte corresponding to a capacity of 3.80 mAh) is plated on the copper foil using a constant current of 0.38 mA/cm² and subsequently completely removed by applying the inverse current up to the potential of 0.50 V, giving $Q_{clean}$ which is used to calculate 1$^{st}$ cycle efficiency in FIGS. 1 & 2 through $CE_{1st}=Q_{clean}/Q_{initial}$.

Subsequently another approximately 1 mg/50 μL of electrolyte of lithium metal corresponding to a capacity of 3.80 mAh (2$^{nd}$ $Q_{initial}$) is plated on the copper foil using the same current density.

After this, 50 cycles (n) with the current density of 0.380 mA/cm² and each cycle cycling 12.5% of the total (3.80 mAh, $Q_{initial}$) capacity (0.475 mAh in our setup) were performed.

After the completion of the 50$^{th}$ cycle, the remaining lithium was stripped away from the copper electrode by applying a current density of 0.380 mA/cm² to the cut-off voltage of 0.5 V (giving $Q_{final}$).

Figure 5:
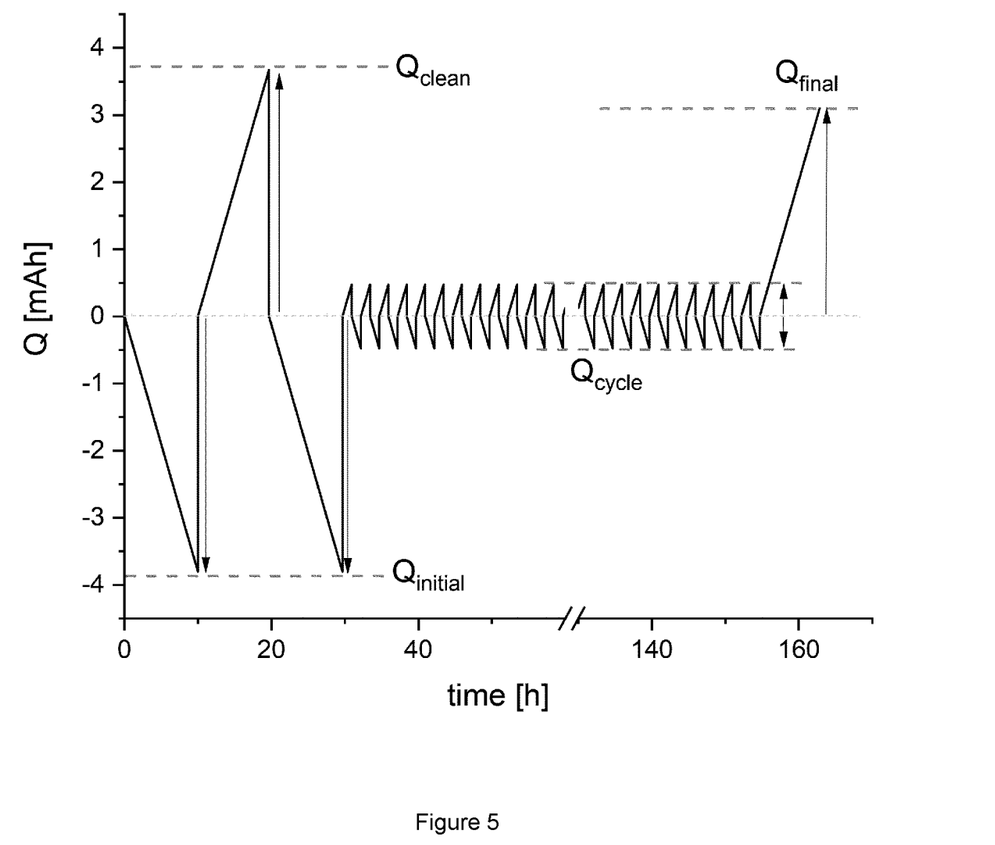
FIG. 5: Voltage profile of the procedure described in Section 4 of the Examples.

FIG. 5 shows a typical voltage profile of the procedure described above.

The CE was calculated using following general formula:

$$CE = \frac{n \cdot Q_{cycle} + Q_{final}}{n \cdot Q_{cycle} + Q_{initial}}$$

Based on the $Q_{cycle}$, $Q_{initial}$, and n are known (see the description of experiment above) the formula can be simplified to:

$$CE = \frac{23.75 \text{ mAh} + Q_{final}}{27.55 \text{ mAh}}$$

4. Experimental Tests and Results

Figure 1:
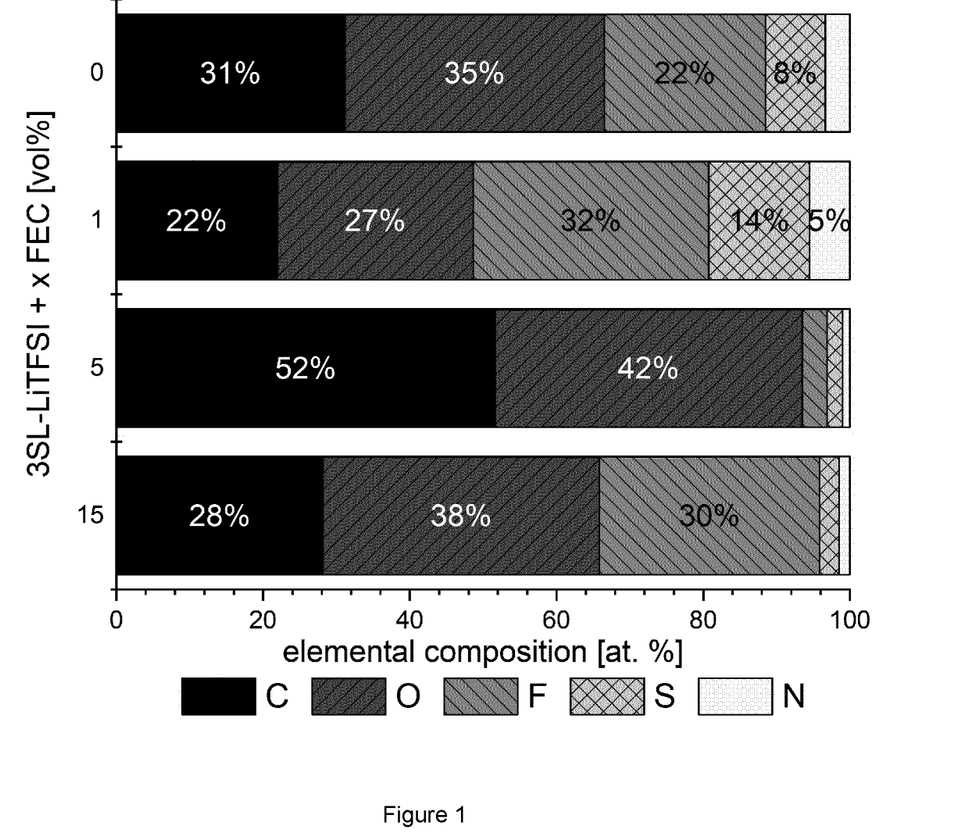
FIG. 1: Elemental distribution of the solid electrolyte interphase composition at the negative electrode when using an electrolyte composition with varying vol. % fluoroethylene carbonate (FEC) and at a molar ratio between sulfolane (SL) and lithium bis(trifluoromethansulfonyl)imide (LiTFSI) of 3 to 1 as measured by X-ray photoelectron spectroscopy analysis (XPS).

The elemental distribution as measured by X-ray photoelectron spectroscopy analysis of the solid electrolyte interphase composition at the negative electrode when using an electrolyte composition with varying vol. % fluoroethylene carbonate (FEC) and at a molar ratio between sulfolane (SL) and lithium bis(trifluoromethansulfonyl)imide (LiTFSI) of 3 to 1 is shown in FIG. 1.

Figure 2:
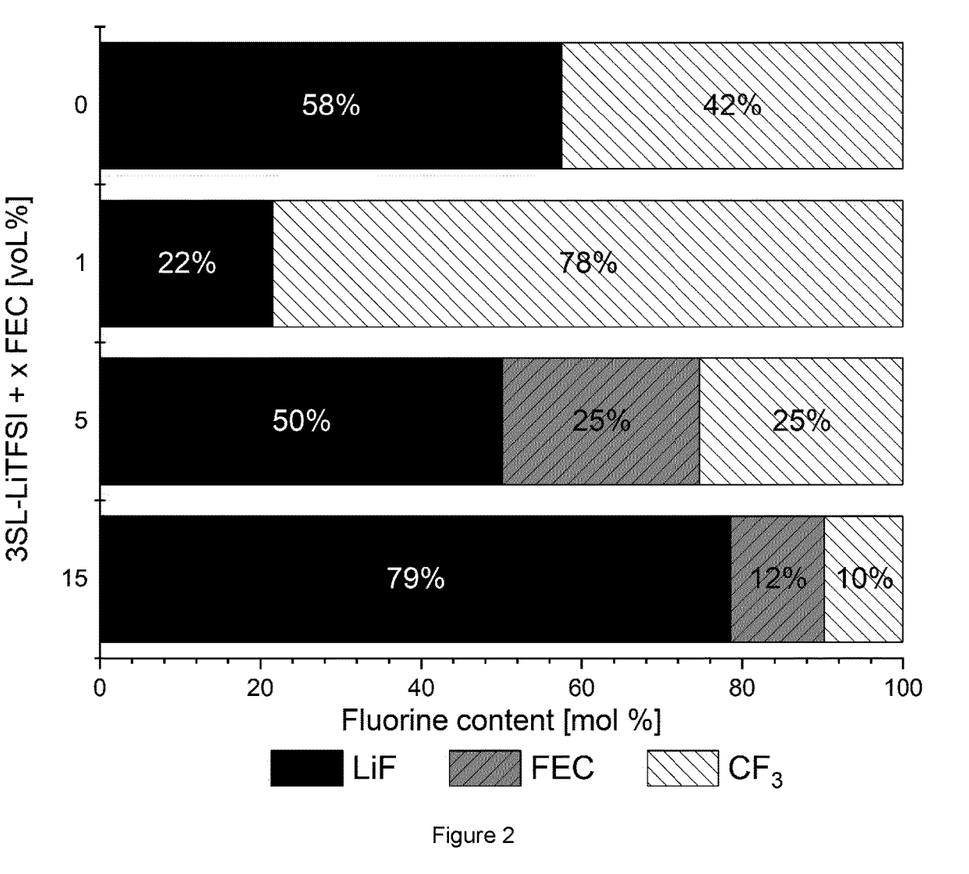
FIG. 2: Relative fluorine distribution of the F elemental distribution based on LiF and $CF_3$.

Relative fluorine distribution of the F elemental distribution based on LiF, fluoroethylene carbonate (FEC) and $CF_3$ is shown in FIG. 2.

FIG. 2 shows that with increasing amounts of FEC in the electrolyte composition the solid electrolyte interphase comprises an increasing amount of LiF and a decreasing amount of detectable $CF_3$ groups.

Figure 3:
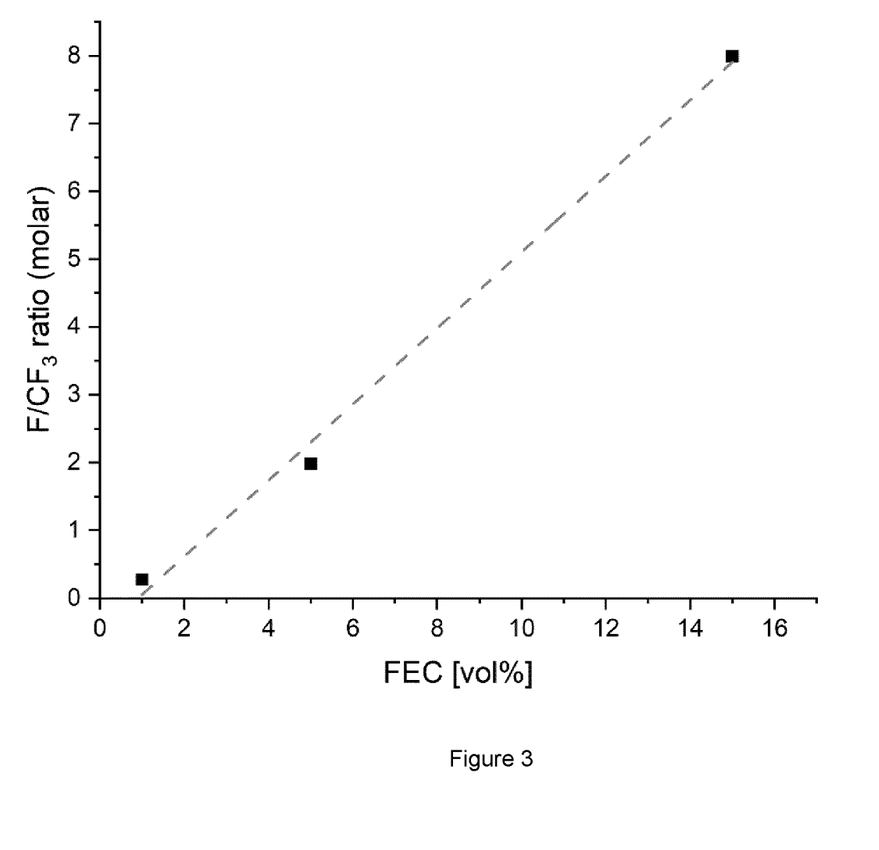
FIG. 3: Correlation between the F/$CF_3$ molar ratio of the solid electrolyte interphase and the vol. % of the fluoroethylene carbonate (FEC) of the electrolyte composition.

Plotting between the F/$CF_3$ molar ratio of the solid electrolyte interphase and the vol. % of the fluoroethylene carbonate (FEC) of the electrolyte composition is shown in FIG. 3.

FIG. 3 shows that there is a linear correlation between the F/$CF_3$ molar ratio of the solid electrolyte interphase and the vol. % of FEC.

Plotting between the coulombic efficiency and the F/$CF_3$ molar ratio in the solid electrolyte interphase is shown in FIG. 4.

FIG. 4 shows that there is an asymptotic correlation between the CE and the molar F/$CF_3$ ratio in the solid electrolyte interphase. It can be concluded that for the CE to F/$CF_3$ molar ratio, a saturation seems to occur in direction of 3 indicating that the coulombic efficiency will also have an optimum at 3.

The invention claimed is:

1. A battery cell comprising a negative electrode and an electrolyte composition, wherein the negative electrode comprises a negative electrode material and a solid electrolyte interphase composition (SEI) on a surface of said negative electrode material,
    wherein said solid electrolyte interphase composition has a molar ratio F:CF3 (x) of 2.00<x≤12.00, as determined by XPS of the respective peak intensities corresponding to F at a binding energy of 685.5 eV in an XPS spectrum and to CF3 at a binding energy of 689 eV, and
    wherein the electrolyte composition comprises fluoroethylene carbonate (FEC) in an amount (y) of 0<y≤15.0 vol. %, and sulfolane and lithium bis(trifluoromethanesulfonyl) imide (LiTFSI) in a molar ratio (z) sulfolane to LiTFSI of 2.0<z<4.0.

2. Battery cell according to claim 1 wherein the molar ratio F:CF3 (x) is 2.00<x≤8.00, as determined by XPS.

3. Battery cell according to claim 1, wherein the molar ratio F:CF3 (x) is 3.0<x≤8.00.

4. Battery cell according to claim 1, wherein the solid electrolyte interphase composition is directly attached to the negative electrode.

5. Battery cell according to claim 1, wherein the relative amount of F can be derived from LiF and the relative amount of CF3 can be derived from decomposition products from lithium bis(trifluoromethanesulfonyl) imide (LiTFSI) within the SEI.

6. Battery cell according to claim 1, wherein 2.5<z<3.5.

7. Battery cell according to claim 6, wherein 2.5<z≤3.0.

8. Battery cell according to claim 7, wherein z=3.0.

9. Battery cell according to claim 1, wherein said electrolyte composition comprises fluoroethylene carbonate (FEC) in an amount (y) of 10.0≤y≤15.0 vol. %, relative to the total volume of said electrolyte composition.

10. Battery cell according to claim 9, wherein said molar ratio (z) sulfolane to LiTFSI is 3.

11. Battery cell according to claim 9, wherein said electrolyte composition comprises LiTFSI in an amount (a) of 39.2 vol. %≤a≤47.5 vol. %, fluoroethylene carbonate (FEC) in an amount (y) of 0.0<y≤15.0 vol. % and sulfolane (SL), wherein SL/LiTFSI is comprised in a molar ratio (z) of 2.0≤z≤3.5.

12. Battery cell according to claim 11, wherein 2.5<z≤3.0.

13. Battery cell according to claim 12, wherein z=3.0.

14. Battery cell according to claim 1, comprising a cathode comprising copper foil.

15. Battery cell according to claim 1, said negative electrode material further comprising lithium foil.

16. Battery cell according to claim 1, said negative electrode material consisting essentially of lithium.

17. Battery cell according to claim 16, said negative electrode material consisting essentially of lithium metal.

18. Battery cell according to claim 1, having an operating voltage of at least 4.4 V.

19. Battery cell according to claim 1, having an operating voltage of at most 4.5 V.

20. Battery cell according to claim 1, wherein the solid electrolyte interphase composition is obtained after cycling a coin cell type CR2025 comprising the battery cell cycled 5 times with a current density of 0.60 mA/cm² for 2 hours per half cycle resulting in a capacity of 1.20 mAh/cm² followed by resting of the coin cell for 12 hours.

21. Battery cell according to claim 20, wherein the XPS was measured with an XPS-SAGE HR 150 SPECS X-ray photoelectron spectrometer.

22. Battery cell according to claim 20, wherein XPS measured with an Al-kα anode with 1486.7 eV photon energy utilizing three spectrum sweeps with a 0.05 eV resolution and Peak areas were determined by a weighed least-square fitting of model curves protocol with 70% Gaussian and 30% Lorentzian applied to experimental data, using CASA XPS software.

23. Portable electronic device comprising a battery cell according to claim 1.

* * * * *